United States Patent Office 3,761,354
Patented Sept. 25, 1973

3,761,354
PROCESS FOR THE PRODUCTION OF CEPHALEXIN
Jinnosuke Abe, Shizuoka-ken, Tetsuo Watanabe, Yokohama, and Tsutomu Yamaguchi and Kunio Matsumoto, Shizuoka-ken, Japan, assignors to Toyo Jozo Kabushiki Kaisha, Shizuoka-ken, Japan
No Drawing. Filed Mar. 27, 1972, Ser. No. 238,517
Int. Cl. C12d 9/00
U.S. Cl. 195—29    2 Claims

ABSTRACT OF THE DISCLOSURE

Cephalexin is produced by enzymatic transacylation of 7-acylamino desacetoxy cephalosporanic acid and a phenyl glycine derivative, using an enzyme derived from the microorganism *Bacillus megaterium* B–400 NRRL B–5385 in an aqueous medium.

This invention relates to a process for the enzymatic production of cephalexin from 7-acylamino desacetoxy cephalosporanic acid.

It is known to produce 7-amino-desacetoxy cephalosporanic acid (hereinafter designated as 7-ADCA) from 7-acylamino desacetoxy cephalosporanic acid by enzymatic deacylation. The enzymatic manufacture of cephalexin from 7-ADCA is also known. According to these processes, however, the isolation and refinement of 7-ADCA is quite troublesome due to the amphoteric and water soluble nature of the compound, and therefore economical production of cephalexin was quite a difficult problem.

We have found that cephalexin can be produced, without isolation of 7-ADCA as an intermediate, from 7-acylamino desacetoxy cephalosporanic acid, derived from penicillin, and a phenylglycine derivative, by using an enzyme derived from *Bacillus megaterium* B–400 NRRL B–5385.

The taxonomic characteristics of this microorganism are similar to *Bacillus megaterium* var. *penicillalyticum* ATCC 14945, except as to the following points:

| | NRRL B–5385 | ATCC 14945 |
|---|---|---|
| Liquefaction of gelatin | Almost no liquefaction. | Slowly liquefied. |
| Litmus milk | Reduction of pigment. | No reduction, changes to alkaline (observed at 30° C. for 30 days). |
| Potato agar | Water soluble brown pigment formation. | No pigment formation (at 30° C. for 30 days). |
| Acid production from mannose. | Positive production | Negative production. |

Therefore, the strain *Bacillus megaterium* B–400 is a new strain and has been deposited in the Institute for Microbiological Industry and Technology, Agency of Industrial Science & Technology, Japan, and added to its permanent culture collection as a deposit number FERM–P No. 748. This strain has also been deposited at the United States Department of Agriculture Agricultural Research Service, Northern Utilization Research and Development Division, and added to its permanent culture collection as deposit number NRRL B–5385.

The present invention more particularly relates to a process for the production of cephalexin characterized in that a compound of the formula

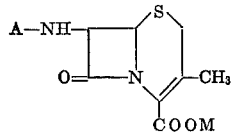

wherein A is phenylacetyl or phenoxyacetyl and M is hydrogen or alkali metal, and a phenylglycine derivative of the formula

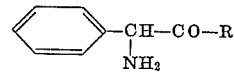

wherein R is a member selected from the group consisting of hydrogen, amino, glycyl, leucyl, alanyl methyl and ethyl, are treated with an enzyme derived from a microorganism strain *Bacillus megaterium* B–400 NRRL B–5385, and then isolating cephalexin from the reaction mixture.

Thus by the present invention the important antibiotic substance cephalexin is produced from 7-acylamino desacetoxy cephalosporanic acid by enzymatic transacylation, without isolation and refinement of 7-ADCA.

A cephalosporine derivative of Formula I (hereinafter designated as DCe [I]) is synthesized from penicillin produced by fermentation such as penicillin G and penicillin V, and is produced by the so-called ring expansion process such the known method in which an oxide of a penicillin ester is heated and refluxed with p-toluene sulfonate in an inert organic solvent; the oxide of the penicillin ester is reacted with haloalkane phosphate or o-substituted ortho phosphate in an inert organic solvent.

DCe [I] may be used in the form of a salt with a cation which does not inhibit the enzyme action. Such a salt will be usually water soluble and will be an alkali metal such as sodium or potassium.

A phenylglycine derivative of Formula II (hereinafter designated as PG [II]) or a salt thereof is reacted with the amino group in the 7-position in 7-ADCA to provide an alpha-aminophenylacetoamide group. In this case a carboxyl group of phenylglycine may ordinarily be replaced by any reactive group. Phenylglycine, phenylglycinamide, phenylglycylgylcine, phenylglycylleucine, phenylglycylalaine, phenylglycine methyl ester, phenylglycine ethyl ester and the like may preferably be used. Among the compound recited hereinabove, the water insoluble or difficultly soluble compounds may generally be used as water soluble salts without having any detrimental effect on enzyme action.

PG [II] or a salt thereof will be present as an optical isomer, however it may naturally be used in the form of an optically active compound.

As an example of a microorganism which produces deacylase and provides an acylating enzyme of the 7-position amino group in 7-ADCA, there will be given the hereinbefore described *Bacillus megaterium* B–400 NRRL B–5385.

An enzyme of the present invention means a cultured broth or filtrate of the microorganism *Bacillus megaterium* B–400 NRRL B–5385, which produces deacylase and acylase at the 7-position amino group in 7-ADCA, and an enzyme preparation prepared therefrom. This enzyme shows a deacylase activity and acylase activity with respect to 7-position amino group in 7-ADCA. A cultured broth may preferably be used with or without concentration. Enzyme preparation can be conducted by known isolation and refinement procedures. For example, a crude enzyme can be obtained by adding a water soluble salt such as ammonium sulfate or sodium chloride to a concentrated or non-concentrated cultured broth to saturate or partially saturate the same, or it can be precipitated by adding a water-miscible organic solvent such as methanol, ethanol or acetone. Low molecular weight impurities can be removed by dissolving the crude enzyme in water and dialyzing it with a semi-permeable membrane. Furthermore, low molecular weight impurities, coloring materials, proteinous impurities and the like in cultured filtrates can be effectively separated by a procedure such as adsorption chromatography, ion-exchange chromatography or gel filtration. Enzyme solutions obtained by these refining procedures may be concentrated in vacuo or freeze-dried to provide a powdered enzyme preparation, or they can be directly used for the enzyme reaction. If it is necessary to purify the enzyme, procedures for refinement of proteins and enzymes such as adsorption, gel-filtration or the like may effectively be applied.

According to the process of the present invention, DCe [I] and PG [II] are treated with an enzyme derived from *Bacillus megaterium* B–400 NRRL B–5385, which produces deacylase and acylase at the 7-position of 7-ADCA, to produce cephalexin. An optimum pH of this enzymic action is about pH 7–8, and therefore the transacylation reaction is preferably carried out at pH 7–8 in order to promote the reaction. For this purpose the reaction medium should be controlled at pH 7–8 or the reaction should preferably be carried out in a buffered solution of pH 7–8. The reaction may proceed at about 30–45° C., preferably at 35–40° C. The time of the above-mentioned enzymatic reaction is, although variable in accordance with the conditions employed, generally 1 to 10 hours. When the reaction mixture reaches its highest potency in terms of cephalexin, the reaction should naturally be terminated.

The produced cephalexin can be isolated from the reaction liquid according to known processes employed in the case of the isolation of cephalexin. For example, the reaction liquid can be ultra-filtered in order to remove high molecular proteins and enzymes, adjusted to pH 2–3 by addition of acid, and washed with ethyl acetate, butyl acetate, methyl isobutyl ketone or the like water-immiscible organic solvent to eliminate unreacted DCe [I]. Further the aqueous layer can be adjusted to pH 1 by acid addition, extracted with water-immiscible organic solvent such as methyl isobutyl ketone, and after dehydrating the organic solvent layer, concentrating the solvent layer to precipitate the cephalexin as an acid salt. Alternatively, the said acid salt is dissolved in water, and this solution is treated with anion exchange resin in the presence of a water immiscible organic solvent, then the aqueous layer is subjected to concentration or freeze drying, or an aqueous solution of the acid salt is adjusted to about pH 4.5 by adding a base, thereby isolating the cephalexin as the free base. Alternatively, by passing the reaction liquid through an anion exchange resin and eluting with an acid solution such as aqueous acetic acid thereafter, the cephalexin, unreacted DCe [I] and PG [II] can be advantageously eluted. Fractions containing cephalexin are concentrated, dissolved in water and adjusted to pH 4.5, and then the cephalexin can be isolated as the free base. Furthermore free cephalexin can also be converted to a non-toxic salt such as an alkali metal salt by conventional procedures.

ASSAY METHOD FOR CEPHALEXIN

Potency or activity of cephalexin can be microbiologically assayed at 37° C. for 16 hours by the paper-disc or cup method using *Bacillus subtilis* PCI-219 as a test organism.

The present invention will be illustrated below with reference to examples, but the various reaction operations and separation procedures which may be employed in the present process are of course not limited to those shown in the examples.

Example 1

(1) Preparation of enzyme: Twenty liters of an aqueous medium (pH 7) consisting of polypeptone 1%, meat extract 1% and sodium chloride 0.5%, balance water, were introduced into a 30 l. jar-fermenter, sterilized at 120° C. for 20 minutes, inoculated with 200 ml. of seed culture of *Bacillus megaterium* B–400 NRRL B–5385, previously cultured in the same medium at 30° C. for 24 hours, and then cultured at 30° C. for 48 hours, with aeration of 20 l./min., agitation 300 r.p.m. After fermentation, the microorganism was centrifugally removed to obtain 17.4 l. of cultured filtrate. The filtrate was concentrated to ⅓ volume at 30–35° C. and ammonium sulfate was added to 80% saturation in the obtained concentrate. The precipitate formed was separated and dissolved in distilled water, thereafter desalted by passing through a column of Sephadex G–25 (trade name, product of Pharmacia Co., Upsalla, Sweden). The desalted enzyme solution was subjected to freeze-drying to obtain 24.3 g. of enzyme preparation.

(2) Preparation of cephalexin: Twenty milligrams of sodium 3-methyl-7-phenoxyacetamide-$\Delta^3$-cepham-4-carboxylate and 80 mg. of D-phenylglycine ethyl ester hydrochloride were dissolved in 10 ml. of 0.1 N phosphate buffer (pH 7.5.). To this solution was added 100 mg. of enzyme preparation obtained hereinabove and incubated at 37° C. for 5 hours. The reaction liquid was spotted on a thin layer chromatography plate of cellulose derivative and developed with a solvent system of n-butanol—acetic acid—water (3:1:1) and a spot of the cephalexin was found at Rf 0.65.

The reaction liquid was adjusted to pH 2 with 1 N hydrochloric acid, washing with ethyl acetate to remove unreacted 3-methyl-7-phenoxyacetamide-$\Delta^3$-cepham-4-carboxylate and the yield of cephalexin was assayed as 9.1%.

Example 2

(1) Preparation of enzyme: Twenty liters of an aqueous medium (pH 7.0) consisting of glucose 0.5%, glycerine 0.3%, meat extract 1.0% and polypeptone, 1.0%, balance water, were introduced into a 30 l. jar-fermenter, sterilized at 120° C. for 20 minutes, inoculated with 200 ml. of seed culture of *Bacillus megaterium* B–400 NRRL B–5385, previously cultured in the same medium at 30° C. for 24 hours, and then cultured at 30° C. for 72 hours, with aeration of 20 l./min., agitation 300 r.p.m. After fermentation the microorganism was centrifugally removed. The filtrate was concentrated to ⅓ volume at 30–35° C. and acetone was added to 60% of the volume. The precipitate was filtered and dried to obtain 25.5 g. of enzyme preparation.

(2) Preparation of cephalexin: 0.01 mole (3.45 g.) of sodium 3-methyl-7-phenylacetamide-$\Delta^3$-cepham-4-carboxylate and 10 g. of D-phenylglycine ethyl ester hydrochloride were dissolved in 1 l. of 0.1 N phosphate buffer (pH 7.5.). To this solution was added 10 g. of enzyme preparation obtained hereinabove and incubated at 37° C. for 5 hours. The reaction mixture was passed through an ultra-microfilter and concentrated to about half volume under reduced pressure. The concentrate was adjusted to pH 2.5 with addition of trifluoroacetic acid under ice-cooling, washed with ethyl acetate to remove unreacted 3-methyl-7-phenylacetamide-$\Delta^3$-cepham-4-carboxylate, and further concentrated in vacuo to ¼ volume. The thus-concentrated solution was adjusted to pH 1 with trifluoroacetic acid and extracted repeatedly with methyl isobutyl ketone. The organic solvent layer was collected, dehydrated with silica gel, and concentrated. The residue was treated with ethyl ether and the cephalexin trifluoroacetate was obtained as a pinkish powder.

This salt was dissolved in 5 ml. of water and adjusted to pH 4.5 with triethylamine under ice-cooling. 10 ml. of acetone was added to the resulting suspension and the precipitate was collected by filtration and washed with ice-cooled 80% aqueous acetone. After drying 33.2 mg. of white powdery cephalexin was obtained (yield 9.6%).

Optical rotation $[\alpha]_D^{20} = +149$ (c.=1, $H_2O$).

UV spectrum: absorption at 261 and 237 m$\mu$.

Example 3

100 ml. of aqueous medium (pH 7.0) consisting of glucose 0.5%, glycerin 0.3%, meat extract 1% polypeptone 1% and sodium chloride 0.5%, balance water, was introduced into a 500 ml. Erlenmeyer flask, sterilized at 120° C. for 20 minutes, inoculated with *Bacillus megaterium* B–400 NRRL B–5385 and then cultured at 30° C.

for 48 hours. After cultivation the filtrate was adjusted to pH 7.5 with 1 N NaOH, adding 50 mg. of sodium 3-methyl-7-phenylacetamide - $\Delta^3$ - cepham-4-carboxylate and 100 mg. of D-phenylglycine ethyl ester hydrochloride, then incubated at 37° C. for 5 hours. The reaction mixture was checked on thin layer chromatography of cellulose derivative by developing with n-butanol—acetic acid—water (3:1:1), and a spot recognized as cephalexin was found at $Rf$ 0.66. This reaction mixture was adjusted to pH 2 with 1 N HCl, and washed with ethyl acetate to remove unreacted 3-methyl-7-phenylacetamide-$\Delta^3$-cepham-4-carboxylate. Cephalexin yield was assayed as 19.4%.

Example 4

In Example 3, D-phenylglycine ethyl ester hydrochloride was replaced by D-phenylglycine methyl ester to provide a 13.4% yield of cephalexin.

Example 5

Example 3 was repeated, except that the D-phenylglycylamide was used in place of D-phenylglycine ethyl ester hydrochloride. In the reaction mixture a 14.6% yield of cephalexin was assayed.

Example 6

Example 3 was repeated, except that the D-phenylglycylglycine was used in place of D-phenylglycine ethyl ester hydrochloride. In the reaction liquid, the yield of cephalexin was 9.6%.

Having described our invention, we claim:

1. A process for the production of cephalexin, comprising reacting a cephalosporin derivative of the formula

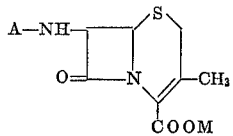

[I]

wherein A is a member selected from the group consisting of phenylacetyl and phenoxyacetyl and M is a member selected from the group consisting of hydrogen and alkali metal, with a phenylglycine derivative of the formula

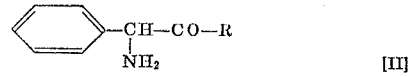

[II]

wherein R is a member selected from the group consisting of hydrogen, amino, glycyl, leucyl, alanyl, methyl and ethyl, in the presence of an enzyme which shows deacylase and acylase activity at the 7-position amino group in 7-ADCA and is derived from the microorganism *Bacillus megaterium* B-400 NRRL B-5385.

2. A process according to claim 1, in which said phenylglycine derivative is present in an amount one to ten times stoichiometric and the reaction is carried out at 35–40° C. and pH 7–8 for 1–10 hours.

References Cited

UNITED STATES PATENTS 3,522,250   7/1970   Kerwin et al. _____ 195—29

ALVIN E. TANENHOLTZ, Primary Examiner

U.S. Cl. X.R.

195—30